United States Patent

Haack et al.

Patent Number: 5,889,102
Date of Patent: *Mar. 30, 1999

[54] PLASTIC MOLDING COMPOSITIONS WITH LOW WEAR

[75] Inventors: Ulrich Haack, Alsbach-Hähnlein; Klaus Kurz, Kelsterbach; Oskar Schleith, Hofheim, all of Germany

[73] Assignee: Ticona GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 804,604

[22] Filed: Feb. 24, 1997

[30] Foreign Application Priority Data

Feb. 23, 1996 [DE] Germany .................. 196 06 948.3

[51] Int. Cl.⁶ .................................................. C08K 3/40
[52] U.S. Cl. .................. 524/494; 524/310; 524/311; 524/496
[58] Field of Search ................... 524/310, 311, 524/494, 496

[56] References Cited

U.S. PATENT DOCUMENTS

| | | | |
|---|---|---|---|
| 4,051,096 | 9/1977 | Koseki | 524/508 |
| 4,548,964 | 10/1985 | Yoshida | 524/310 |
| 4,670,508 | 6/1987 | Ohdaira | 524/495 |
| 4,737,539 | 4/1988 | Jinno | 524/508 |
| 4,927,870 | 5/1990 | Ogoe | 524/537 |
| 4,945,126 | 7/1990 | Crosby | 524/513 |
| 4,960,813 | 10/1990 | Wadhwa | 524/311 |
| 4,973,626 | 11/1990 | Wilkus | 525/104 |
| 5,055,508 | 10/1991 | Ohtsubo | 524/310 |
| 5,063,263 | 11/1991 | Hayes | 524/101 |
| 5,106,888 | 4/1992 | Kosinski | 524/377 |
| 5,179,152 | 1/1993 | Shimaoka | 524/494 |
| 5,212,223 | 5/1993 | Mack | 524/300 |
| 5,258,434 | 11/1993 | Hanabusa | 524/310 |
| 5,302,651 | 4/1994 | Kawashima | 524/311 |
| 5,346,737 | 9/1994 | Takahashi | 524/517 |
| 5,401,799 | 3/1995 | Kohlhepp | 524/425 |
| 5,409,979 | 4/1995 | Nakai | 524/311 |
| 5,478,874 | 12/1995 | Miyouga | 524/156 |
| 5,510,412 | 4/1996 | Suzuki | 524/440 |

*Primary Examiner*—Paul R. Michl
*Attorney, Agent, or Firm*—Connolly & Hutz

[57] ABSTRACT

Molding compositions comprising a thermoplastic, at least one lubricant and at least one fibrous material have high abrasion resistance and high rigidity. The molding compositions comprise, for example, polyoxymethylene, ultrahigh-molecular-weight polyethylene as lubricant and glass fibers. The molding compositions are used for the production of gearwheels, toothed racks, bearings and chains.

8 Claims, No Drawings

PLASTIC MOLDING COMPOSITIONS WITH LOW WEAR

Glass-fiber-reinforced polyoxymethylene exhibits high wear.

Surprisingly, it has been found that thermoplastics containing a lubricant and a fibrous reinforcing material have significantly lower abrasion and better rigidity than thermoplastics containing only a lubricant or a fibrous material.

The invention thus relates to molding compositions comprising a thermoplastic, a lubricant and a fibrous material.

Examples of thermoplastics are polyesters, polyamides, polycarbonates, polyolefins, polyoxymethylene and liquid-crystalline polymers (LCPs). Preferred thermoplastics are polyacetals, polyesters and polyamides.

Polyacetals, in particular polyoxymethylene, cover homopolymers and copolymers. Polyacetals are described in Becker/Braun, "Kunststoff-Handbuch", Volume 3/1, Chapter 4—Polyacetals, Carl Hanser Verlag, Munich, Vienna 1992, pages 300–395, which is incorporated herein by way of reference.

Preferred polyesters are polyethylene terephthalate (PET) and polybutylene terephthalate (PBT). Preferred polyamides are nylon 66 and nylon 46. Polyamides and polyesters are described, for example, in "Ullmann's Encyclopedia of Industrial Chemistry", ed. Barbara Elvers, Vol. A21, Polyamides (pp. 179–205) and Polyesters (pp. 227–251), VCH, Weinheim-Basle-Cambridge-New York 1992, which is incorporated herein by way of reference.

Lubricants are additives which improve the sliding and abrasion behavior of plastics. Examples of lubricants are molybdenum disulfide, silicone oils, fatty alcohols, fatty alcohol dicarboxylates, fatty acid esters, fatty acids, fatty acid monoamides, fatty acid diamides (amide waxes), metal soaps, oligomeric fatty acid esters (fatty acid complex esters), fatty alcohol fatty acid esters, wax acids, wax acid esters (for example montan acid esters and partially hydrolyzed montan acid esters), polar polyethylene waxes, nonpolar polyethylene waxes, paraffins, fluoropolymers and ultrahigh-molecular-weight polyolefins. Lubricants can also be combinations of various lubricants (combination lubricants). Lubricants are described in Gächter/Müller, "Taschenbuch der Kunststoff-Additive", 3rd Edition, Carl Hanser Verlag Munich, Vienna 1994, pages 478–504, which is incorporated herein by way of reference. Preferred lubricants are polytetrafluoroethylene (PTFE), ultrahigh-molecular-weight polyethylene, stearyl stearate and pentaerythritol tetrastearate. A particularly preferred lubricant is ultrahigh-molecular weight polyethylene.

Fibrous materials or reinforcing materials are mineral fibers, glass fibers, modified glass fibers, whiskers, polymer fibers, carbon fibers and organic high-modulus fibers. Modified glass fibers are generally glass fibers which have been treated chemically in order to improve the adhesion of the glass fibers to the plastic. The glass fibers are frequently treated with organic silanes. Preferred fibrous materials are modified and unmodified glass fibers.

The molding compositions of the invention comprise, for example, from 50 to 90 percent by weight, preferably from 60 to 80 percent by weight, of a thermoplastic, from 5 to 30 percent by weight, preferably from 5 to 20 percent by weight, of a lubricant, and from 5 to 40 percent by weight, preferably from 10 to 30 percent by weight, of a fibrous material, where the sum of the proportions adds up to a maximum of 100 percent by weight. The molding compositions may contain conventional fillers, such as chalk, talc, clay, mica, glass beads, zinc oxide, titanium dioxide and wollastonite, and further conventional additives and processing auxiliaries, such as dyes, pigments, release agents, antioxidants and UV stabilizers. The proportion of these additives is usually from 0 to 50 parts by weight, preferably from 5 to 40 parts by weight, per 100 parts by weight of the total composition.

Preference is given to molding compositions which comprise a polyacetal, at least one lubricant and at least one fibrous material. Particular preference is given to molding compositions which comprise a polyacetal, ultrahigh-molecular-weight polyethylene or PTFE and at least one fibrous material. A particularly advantageous molding composition comprises a polyacetal, ultrahigh-molecular-weight polyethylene and unmodified or modified glass fibers. Such molding compositions are distinguished by particularly high abrasion resistance and rigidity.

Ultrahigh-molecular-weight polyethylene is employed, for example, as a powder, in particular as a micropowder. The powder generally has a mean particle diameter $D_{50}$ in the range from 1 to 5000 $\mu$m, preferably from 10 to 500 $\mu$m, and particularly preferably from 10 to 150 $\mu$m.

The modified or unmodified glass fibers generally have a nominal diameter in the range from 1 to 1000 $\mu$m, preferably in the range from 1 to 100 $\mu$m, particularly preferably in the range from 1 to 20 $\mu$m. The modified or unmodified glass fibers generally have a mean fiber length in the range from 0.1 to 100 mm, preferably in the range from 1 to 100 mm, particularly preferably in the range from 5 to 20 mm.

The molding compositions of the invention, in particular molding compositions containing polyacetal, are particularly suitable for the following uses:

Automotive industry:
  Sliding and functional parts in seatbelt retractor systems, gearwheels and functional parts, including for windscreen wiper drives and control rods, windscreen wiper bearings, seat adjusters, window winder drives, mirror adjusters and sliding sunroofs.

General machine construction and precision mechanics:
  Conveyor chains, toothed racks and gearwheels (including for drive elements), adjustment mechanisms, bearing bushes and functional parts (including for railways and aerial tramways).

Furniture industry:
  Hinges (including for cupboards and writing desks), sliding bearing blocks, rollers and wear strips (including for drawers and sliding doors).

Small appliances:
  Gearwheels in food processors, mincers, hand mixers, choppers, juicers, citrus presses, oats rollers and universal slicers.

White goods:
  Door hinges for dishwashers, washing machines and driers, functional parts for belt tighteners in washing driers, individual parts for shock absorbers, washing machines, housings for door brakes in dishwashers, pulleys for washing driers.

Power tools (preferably the DIY sector):
  Gearwheels for electric lawn-care equipment, lawn mowers, grass shears, gearwheels for electric hedge trimmers and chain saws, functional parts in shredders.

Further applications are: bearing blocks, functional parts for electric epilators, nozzle parts for vacuum cleaners, functional parts for razors, beard trimmers, hair trimmers, outsert applications (rigid sliding bearings).

Examples

Examples 1 to 3 and Comparative Examples A and B were carried out using a copolymer of trioxane with dioxolane having a melt flow rate MFR 190/2.16 of 2.5 g/10 min (®Hostaform C 2521). The following additives were added to the copolymer:

PE-UHMW micropowder, mean particle diameter 120 µm, viscosity number in accordance with DIN 53 728-4= 2300 ml/g.

Chopped glass fibers, nominal diameter of the filaments about 13 µm, mean fiber length about ca. 4.5 mm.

The copolymer was mixed with the above additives in a slow-running mixer, then fed to a ZSK 25 twin-screw extruder (Werner and Pfleiderer, Stuttgart, Germany), melted at a material temperature of about 200° C. and pelletized.

After drying in a circulating-air drying cabinet for eight hours at 120° C., the specimens for testing the mechanical, thermal and tribological properties were produced on a KM 90/210 B injection-molding machine (Krauss Maffei, Munich, Germany). The processing conditions were selected in accordance with the recommendations of the ISO 9988-2 standard for polyoxymethylene.

The following parameters were measured:
Modulus of elasticity in tension in accordance with ISO 527, Parts 1 and 2
Heat deflection temperature HDT/A in accordance with ISO 75, Parts 1 and 2
Charpy impact strength in accordance with ISO 179 1 eU
Wear measurement:
The abrasion was measured by the "pin on ring" test principle in accordance with ISO/DIS 7148-2. Cylindrical test specimens having a diameter of 12 mm made from the material to be tested were pressed onto a rotating shaft, and the wear volume on the test specimens was determined as a function of time.

The test conditions were as follows:

| | |
|---|---|
| Shaft material | Steel |
| Shaft diameter | 65 mm |
| Roughness Rz | 0.8 µm |
| Load | 3.1 N |
| Sliding speed | 136 m/min |
| Test duration | 60 h |

Examples 4 and 5 were carried out using a copolymer of trioxane with dioxolane having a melt flow rate MFR 190/2.16 of 9.5 g/10 min (®Hostaform C 9021). The following additives were added to the copolymer:

PE-UHMW micropowder, mean particle diameter 120 µm, viscosity number in accordance with DIN 53 728-4= 2300 ml/g.

Modified chopped glass fibers, type RES03-TP33G (Nippon Glass Fiber Co., Komoricho Takachya, Japan), nominal diameter of the filaments about 10 µm, mean fiber length about 3 mm. The glass fibers had been silanized and treated with polyurethane.

The specimens for testing the mechanical, thermal and tribological properties were produced by the same process and under the same processing conditions as Examples 1 to 3 and Comparative Examples A and B.

The following parameters were measured:
Modulus of elasticity in tension in accordance with ISO 527 Parts 1 and 2
Heat deflection temperature HDT/A in accordance with ISO 75 Parts 1 and 2
Wear measurement as described for Examples 1 to 3 and Comparative Examples A and B.

TABLE 2

Determination of the wear volume, modulus of elasticity in tension and heat deflection temperature

| Examples | | 4 | 5 |
|---|---|---|---|
| POM copolymer | % by wt. | 85 | 69 |
| Glass fiber | % by wt. | 10 | 26 |
| PE-UHMW | % by wt. | 5 | 5 |
| Wear volume | mm$^3$ | 1.5 | 1.9 |
| Modulus of elasticity in tension ISO 527 | N/mm$^2$ | 4400 | 8800 |
| Heat deflection temp. HDT/A ISO 75 | °C. | 155 | 162 |

We claim:

1. A molding composition comprising a polyacetal thermoplastic, at least one lubricant comprising from 5 to 30% by weight of an ultrahigh-molecular weight polyethylene powder having particles having a particle size of 120 to 5000 µm, and at least one fibrous material.

2. A molding composition as claimed in claim 1, wherein the fibrous material is selected from the group consisting of glass fibers, modified glass fibers, carbon fibers and polymer fibers.

3. A moulding composition as claimed in claim 1, wherein the moulding composition comprises from 50 to 90 parts by weight of the polyacetal thermoplastic.

TABLE 1

Determination of the wear volume, the modulus of elasticity in tension, the heat deflection temperature and the Charpy impact strength

| Examples | | A | B | 1 | 2 | 3 |
|---|---|---|---|---|---|---|
| POM copolymer | % by wt. | 74 | 90 | 80 | 70 | 60 |
| Glass fibers | % by wt. | 26 | — | 10 | 20 | 30 |
| PE-UHMW | % by wt. | — | 10 | 10 | 10 | 10 |
| Wear volume | mm$^3$ | 32 | 1 | 2.8 | 3 | 3.5 |
| Modulus of elasticity in tension ISO 527 | N/mm$^2$ | 9000 | 2200 | 4000 | 6500 | 8900 |
| Heat deflection temp. HDT/A ISO 75 | °C. | 160 | 85 | 116 | 135 | 140 |
| Chary impact strength ISO 179 | mJ/mm$^2$ | 30 | 50 | 32 | 24 | 12 |

4. A moulding composition as claimed in claim 1, wherein the moulding composition comprises from 60 to 80 parts by weight of the polyacetal thermoplastic.

5. A molding composition as claimed in claim 1, wherein the molding composition comprises from 5 to 20 parts by weight of lubricant.

6. A molding composition as claimed in claim 1, wherein the molding composition comprises from 5 to 40 parts by weight of the fibrous material.

7. A molding composition as claimed in claim 1, wherein the molding composition comprises from 10 to 30 parts by weight of the fibrous material.

8. A molding composition comprising a polyacetal thermoplastic, a lubricant and a fibrous material said lubricant comprise an ultrahigh-molecular weight polyethylene powder; said fibrous material is selected from the group of glass fibers, modified glass fibers, carbon fibers and polymer fibers; and wherein the molding composition contains from 50 to 90 parts by weight of said polyacetal thermoplastic, from 5 to 30 parts by weight of said lubricant and from 5 to 40 parts by weight of said fibrous material.

* * * * *